(12) United States Patent
Sankman et al.

(10) Patent No.: US 7,046,528 B2
(45) Date of Patent: May 16, 2006

(54) LOAD-DEPENDENT VARIABLE FREQUENCY VOLTAGE REGULATOR

(75) Inventors: Robert L. Sankman, Phoenix, AZ (US); Shamala Chickamenahalli, Chandker, AZ (US)

(73) Assignee: Intel Corporation, Santa Clara, CA (US)

( * ) Notice: Subject to any disclaimer, the term of this patent is extended or adjusted under 35 U.S.C. 154(b) by 49 days.

(21) Appl. No.: 10/335,185

(22) Filed: Dec. 31, 2002

(65) Prior Publication Data

US 2004/0125623 A1 Jul. 1, 2004

(51) Int. Cl.
*H02M 1/12* (2006.01)

(52) U.S. Cl. .................. 363/41; 323/282; 323/222

(58) Field of Classification Search ............ 323/282, 323/285, 283, 222, 273, 274, 284, 286; 363/41
See application file for complete search history.

(56) References Cited

U.S. PATENT DOCUMENTS

| 4,347,559 | A | * | 8/1982 | Sturgeon | 363/21.16 |
|---|---|---|---|---|---|
| 4,679,131 | A | * | 7/1987 | Filliman | 363/21.11 |
| 5,747,976 | A | * | 5/1998 | Wong et al. | 323/282 |
| 5,949,226 | A | * | 9/1999 | Tanaka et al. | 323/285 |
| 6,157,182 | A | * | 12/2000 | Tanaka et al. | 323/284 |
| 6,208,530 | B1 | | 3/2001 | Hosotani | 363/17 |
| 6,252,783 | B1 | | 6/2001 | Huh et al. | 363/21.01 |
| 6,287,167 | B1 | * | 9/2001 | Kondo | 446/454 |
| 6,449,174 | B1 | * | 9/2002 | Elbanhawy | 363/65 |
| 6,453,739 | B1 | * | 9/2002 | Saikalis et al. | 73/204.14 |
| 6,476,588 | B1 | * | 11/2002 | Fohler | 323/222 |

FOREIGN PATENT DOCUMENTS

EP 0993105 A1 4/2000

* cited by examiner

*Primary Examiner*—Bao Q. Vu
(74) *Attorney, Agent, or Firm*—Schwegman, Lundberg, Woessner & Kluth, P.A.

(57) ABSTRACT

A pulse width modulation voltage regulator comprises a pulse width modulation circuit and a control circuit. The control circuit is operable to reduce a pulse modulation frequency of the pulse width modulation circuit when a load current increases and to increase the pulse modulation frequency of the pulse width modulation circuit when the load current decreases.

23 Claims, 2 Drawing Sheets

LOAD-DEPENDENT VARIABLE FREQUENCY VOLTAGE REGULATOR

FIELD OF THE INVENTION

The invention relates generally to voltage regulators, and more specifically to a load-dependent variable frequency pulse width modulated voltage regulator.

BACKGROUND OF THE INVENTION

Electronic device components such as processors and other integrated circuits typically require a power source from which the power to operate the integrated circuit is drawn. The power source ideally provides a constant voltage, and is capable of providing a current that is sufficient to power the various devices it supplies without resulting in a drop in supplied voltage. The task of providing a constant voltage to a load that demands varying degrees of current is typically done by an electronic circuit known as a voltage regulator. Voltage regulators are typically designed to react to changes in load condition to ensure that enough power is provided to the circuit so that the voltage of the supplied power signal remains at or very near the desired level.

Voltage regulators typically are supplied with a voltage greater than the voltage to be supplied by the regulator itself, so that the task of the voltage regulator is to use a power supply providing a large voltage and produce a power supply having a constant lower voltage. One example is a personal computer having a processor running at 3.3 volts. A power supply and voltage regulator operate together to convert the 120 volts of alternating current provided by a wall outlet power connection to a 3.3 volt direct current signal of approximately constant voltage that is used to power the processor.

One method of designing a voltage regulator is to change the supplied high voltage signal into a pulse width modulated signal that feeds an energy storage filter, so that the resulting output signal's voltage is dependent on the width of the high voltage pulses created in the pulse width modulation circuit. The wider the pulses are, the more energy and power is transferred to the energy storage filter circuit, and a higher voltage output signal results. Because the load on voltage regulators varies, and because changing loads will require changing current and therefore changing power be provided by the voltage regulator, the width of pulses can also be varied to change the power provided by the voltage regulator circuit at a certain voltage level. As the load varies to draw more current and therefore draw more power, the width of the pulses must be increased to provide the energy storage filter circuit with more power and therefore maintain the desired voltage at a higher current level. Circuits such as these typically therefore monitor the current drawn and the voltage level, and adjust the width of the pulses produced by the pulse width modulation circuit accordingly.

The frequency of the pulses created by the pulse width modulation circuit is determined by considering a number of factors, including efficiency and size of the voltage regulator circuit. Selecting too low a frequency results in components that are relatively large in physical size and that produce significant ripple or voltage variation in the output signal, while selecting a frequency that is too high results in lower overall efficiency due to the losses from the resulting large number of changes in the electronic state of the various electronic components in the voltage regulator circuit.

A voltage regulator circuit offering minimal ripple and high efficiency that is capable of providing a constant voltage over a wide variety of load conditions is therefore desired.

DETAILED DESCRIPTION

In the following detailed description of sample embodiments of the invention, reference is made to the accompanying drawings which form a part hereof, and in which is shown by way of illustration specific sample embodiments in which the invention may be practiced. These embodiments are described in sufficient detail to enable those skilled in the art to practice the invention, and it is to be understood that other embodiments may be utilized and that logical, mechanical, electrical, and other changes may be made without departing from the spirit or scope of the present invention. The following detailed description is, therefore, not to be taken in a limiting sense, and the scope of the invention is defined only by the appended claims.

The present invention provides in various embodiments a pulse width modulation voltage regulator circuit having a control circuit that is operable to vary the pulse width modulation frequency of the voltage regulator circuit in response to changing current load conditions. The control circuit is operable to reduce a pulse modulation frequency of the pulse width modulation circuit when a load current increases and to increase the pulse modulation frequency of the pulse width modulation circuit when the load current decreases, improving efficiency of the voltage regulator in applications with changing load conditions.

Figure 1:
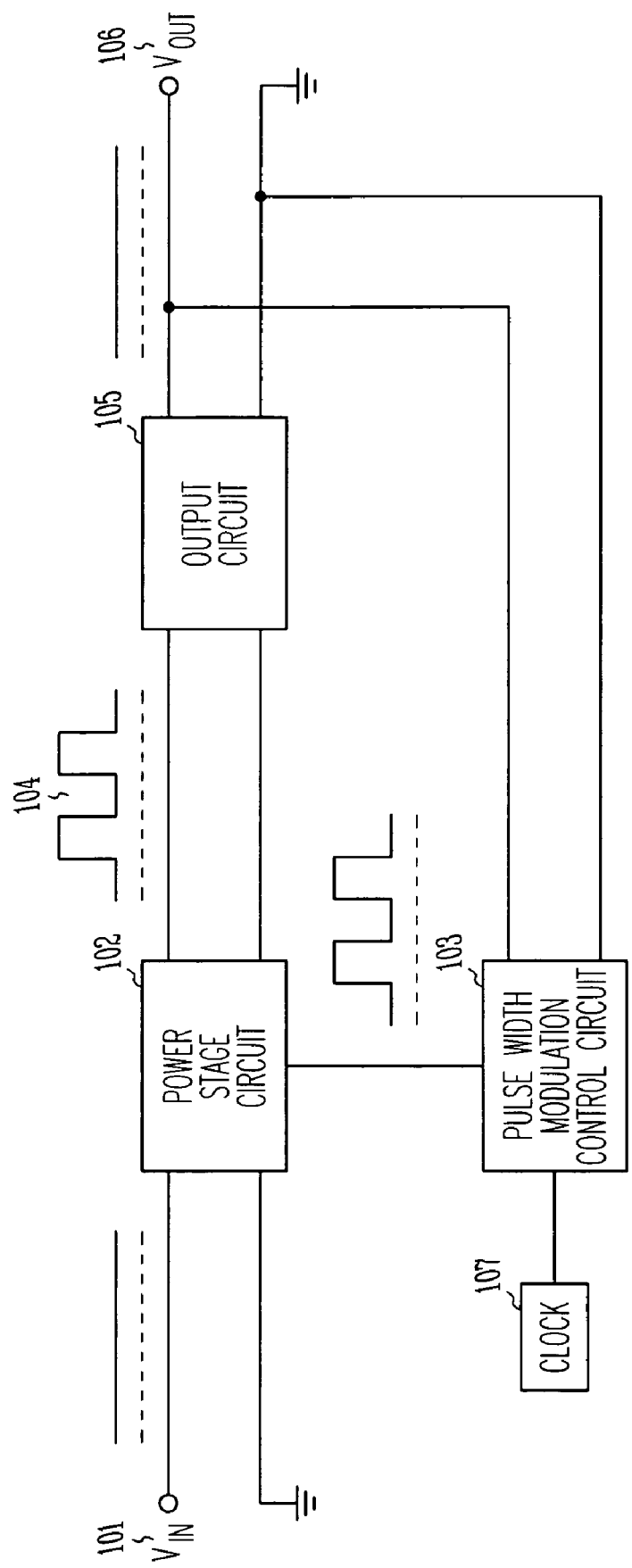
FIG. 1 shows a block diagram of a pulse width modulated voltage regulator circuit, consistent with an embodiment of the present invention.

FIG. 1 shows a block diagram of a pulse width modulated voltage regulator circuit, consistent with an embodiment of the present invention. An input voltage 101 is greater in voltage than the desired output voltage, and is supplied to a power stage circuit 102. The pulse width modulation control circuit 103 provides the power stage circuit 102 with a signal of variable pulse width, which the power stage circuit then applies to its output power signal as shown at 104. This pulse width modulated power signal from the power stage circuit 102 is fed to an output circuit 105, where it is filtered to produce a relatively constant voltage output signal 106 having a desired regulated voltage level.

Output circuit 105 in some embodiments comprises reactive components such as capacitors and inductors, and serves to filter or shape the pulse width modulated signal 104 into a constant voltage signal 106, with a minimal reduction in power or energy. One example output circuit comprises a capacitive filter, wherein capacitors store the energy in the pulses of pulse width modulated signal 104 and provide a relatively constant voltage output signal 106.

The voltage and current of the output signal 106 are monitored and are provided to the pulse width modulation control circuit 103, which in some embodiments is a processor or other digital logic operating from a reference clock signal provided by clock 107. The control circuit monitors the output voltage, and varies the duty cycle or the pulse width of the pulses it provides to the power stage circuit 102 so that the output signal 104 when filtered results in the desired output voltage at 106. The pulse width modulation control circuit 103 of the present invention further monitors the current drawn from the output voltage signal 106, and varies the frequency of the pulse signal it generates and provides to the power stage circuit 102 in response. In some embodiments of the invention, the pulse width frequency is derived from the clock 107, the sensed current drawn from supplied voltage signal 106, and application of a mathematical algorithm or lookup table.

The frequency of the pulse signal 104 is varied such that at low current loads, the frequency of the pulse train is relatively high, resulting in minimal ripple in the output voltage signal 106 and reducing the physical size and filtering requirements of the output circuit 105. A relatively high pulse width modulation frequency also permits faster control circuit response to transients or changes in the output voltage signal 106, producing a more stable and desirable output voltage signal 106 with less ripple. But, as the current load is increased, the capacitances within the voltage regulator circuit and the switching and conduction losses result in a reduced efficiency, such that the voltage regulator circuit dissipates a significant amount of power.

Therefore, at higher load current levels, the frequency of the pulse width modulated power signal 104 is reduced, resulting in lower switching and other losses. This in turn results in a more efficient overall voltage regulator circuit, and less power dissipated in producing the output voltage signal 106 from the supplied voltage input signal 101.

In one embodiment of the invention that employs a lookup table, the number of entries and the values of the entries comprising the lookup table are specified to ensure that a desired degree of output signal regulation is maintained. In one further example, this includes maintaining ripple current in the output voltage signal 106 below a maximum allowable ripple current level. Although the frequency of the pulse width modulation control circuit varies according to the lookup table as the load current varies, the voltage of the output signal 106 is maintained across all frequencies by varying the duty cycle of the pulse width modulated signal provided to the power stage.

Initial estimates of one embodiment of the invention show that varying the pulse width modulation frequency between 200 kHz and 1 MHz with a fixed input and output voltage level but varying output current results in a voltage regulator efficiency that does not drop below 80%, while a fixed frequency regulator circuit operating at 1 MHz exhibits efficiency near 70% and can result in dissipation of approximately 40 Watts at maximum current in a typical processor voltage regulator application. This demonstrates how the variable frequency pulse width modulated voltage regulator of the present invention can result in reduced dissipated power and more efficient voltage regulation.

Figure 2:
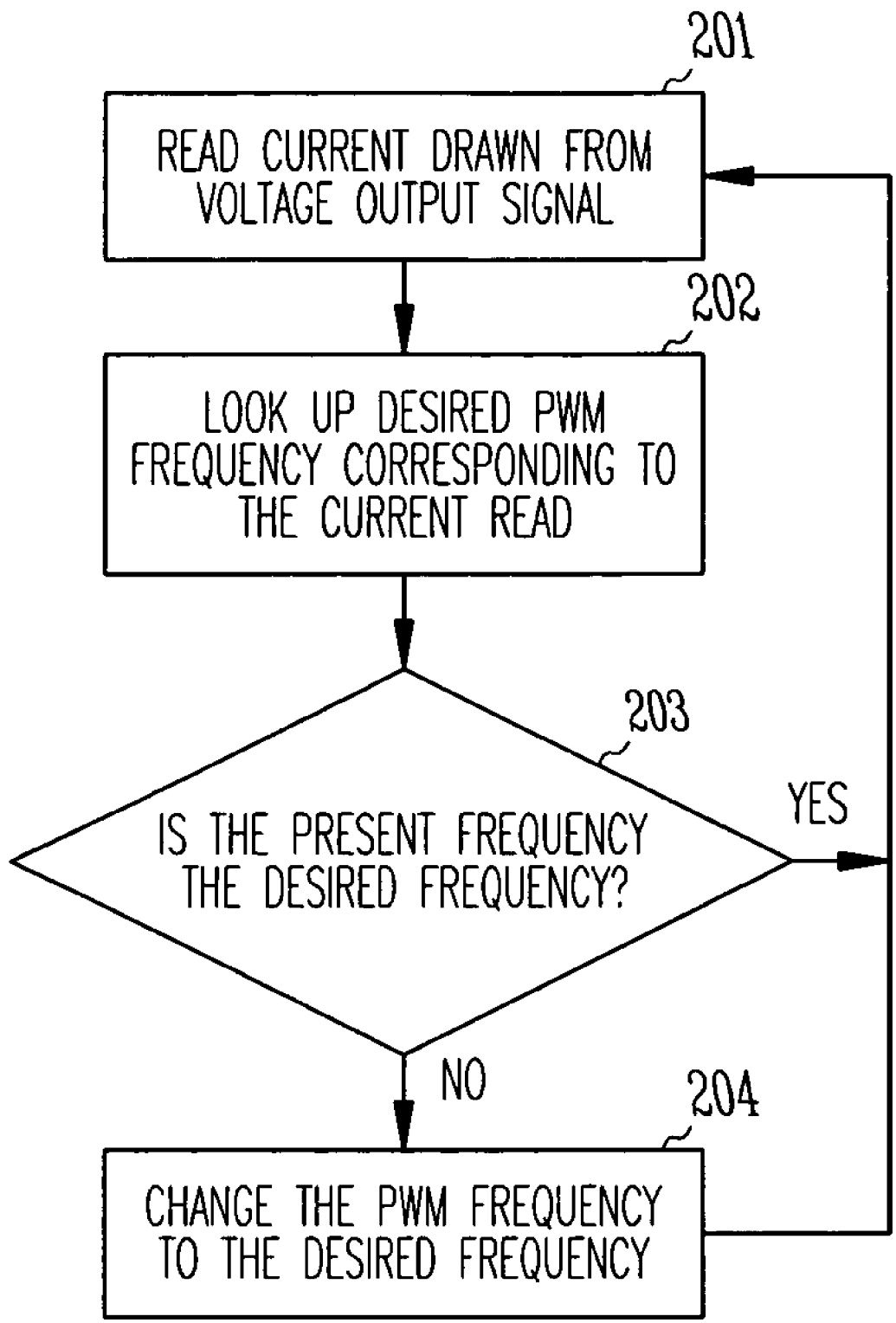
FIG. 2 is a flowchart of a method of operating a pulse width modulated voltage regulator circuit consistent with an embodiment of the present invention.

FIG. 2 is a flowchart of a method of operating a pulse width modulated voltage regulator circuit consistent with an embodiment of the present invention. In one embodiment of the invention, the method shown in the flowchart is implemented in a processor, while in other embodiments it is implemented in combinational logic or via other circuitry.

At 201, the output voltage signal of the variable frequency pulse width modulated voltage regulator circuit is monitored so that the current drawn can be determined. At 202, the drawn current read in 201 is used along with a lookup table to determine the desired pulse width modulation circuit frequency for the specific current detected. At 203, it is determined whether the current operating frequency of the voltage regulator circuit is the desired frequency found in the lookup table at 202, and the operating frequency of the pulse width modulation circuit is changed to the desired frequency at 204 if the desired frequency and the current frequency are not the same. Then the process repeats, returning to 201 such that the current output of the voltage regulator circuit is repeatedly or continuously monitored, and the operating frequency is continually changed to the resulting desired frequency.

In some embodiments of the invention, element 202 is altered such that a lookup table is not used, but an algorithm that maximizes efficiency of the voltage regulator circuit while providing desired ripple and transient response characteristics is used. Such an algorithm is applied in some embodiments via a processor or other digital logic, but is implemented in other embodiments via other circuitry such as an analog filter. In some embodiments where a lookup table is used, the number of entries an values of the entries comprising the lookup table are selected based on the desired responsiveness of the voltage regulator circuit to changes in drawn current.

The variable frequency pulse amplitude modulated voltage regulator of the present invention may in some embodiments be a part of an electronic circuit assembly such as a power supply or a computer printed circuit motherboard. Although typical computers have power supplies that have several voltage regulators providing various output voltages with different current capabilities, it is sometimes desirable to include further voltage regulation or reduction on a motherboard or other electronic circuit assembly. For example, in a computer having a processor running at 1.6 Volts or 3.3 Volts, a power supply signal is often provided by a voltage regulator operating on close proximity to the processor and supplying only the processor, so that the processor receives a well-regulated and isolated voltage supply signal separate from other circuitry. Motherboards, motherboard chipsets, processor modules, and other circuit assemblies incorporating a variable frequency pulse width modulated voltage regulator are therefore desirable due to their improved efficiency and other favorable characteristics, and are within the scope of the present invention.

The examples shown herein illustrate how a variable frequency pulse width modulated voltage regulator circuit consistent with the present invention can provide improved efficiency and reduced power dissipation. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the invention. It is intended that this invention be limited only by the claims, and the full scope of equivalents thereof.

What is claimed is:

1. A pulse width modulation voltage regulator, comprising:
   a pulse width modulation circuit; and
   a control circuit, the control circuit operable to reduce a pulse modulation frequency of the pulse width modulation circuit when a load current increases and to increase the pulse modulation frequency of the pulse width modulation circuit when the load current decreases, and further operable to independently vary both the pulse width and frequency of the pulse width modulation voltage regulator.

2. The pulse width modulation voltage regulator of claim 1, wherein the control circuit uses a lookup table to determine a pulse width modulation circuit frequency for various load current levels.

3. The pulse width modulation voltage regulator of claim 1, wherein the control circuit comprises a processor.

4. The pulse width modulation voltage regulator of claim 1, wherein the control circuit is further operable to change a duty cycle of the pulse width modulation circuit in response to variations in a voltage regulator circuit output voltage.

5. The pulse width modulation voltage regulator of claim 1, wherein the control circuit is operable to restrict the lowest pulse width modulation circuit frequency to a minimum frequency.

6. The pulse width modulation voltage regulator of claim 5, wherein the minimum frequency is above 150 kHz.

7. The pulse width modulation voltage regulator of claim 1, wherein the control circuit is further operable to restrict the highest pulse width modulation circuit frequency to a maximum frequency.

8. The pulse width modulation voltage regulator of claim 7, wherein the pulse width modulation circuit operates at the maximum frequency with no current load.

9. A method of regulating the operation of a pulse width modulated voltage regulator circuit, comprising:
   reducing a pulse modulation frequency of the pulse width modulation circuit when a load current increases; and
   increasing the pulse modulation frequency of the pulse width modulation circuit when the load current decreases,
   wherein the pulse width modulation voltage regulator is operable to independently vary both the pulse width and frequency of the pulse width modulation voltage.

10. The method of claim 9, wherein a lookup table is used to determine a pulse width modulation circuit frequency for various load current levels.

11. The method of claim 1, wherein the operation of the pulse width modulated voltage regulator circuit is performed via a control circuit.

12. The method of claim 11, wherein the control circuit comprises a processor.

13. The method of claim 9, further comprising changing a duty cycle of the pulse width modulation circuit in response to variations in a voltage regulator circuit output voltage.

14. The method of claim 9, further comprising restricting the lowest pulse width modulation circuit frequency to a minimum frequency.

15. The method of claim 14, wherein the minimum frequency is above 150 kHz.

16. The method of claim 9, further comprising restricting the highest pulse width modulation circuit frequency to a maximum frequency.

17. The method of claim 16, wherein the pulse width modulation circuit operates at the maximum frequency with no current load.

18. An electronic circuit assembly, the electronic circuit assembly comprising a voltage regulation module, the voltage regulation module comprising:
   a pulse width modulation circuit; and
   a control circuit, the control circuit operable to reduce a pulse modulation frequency of the pulse width modulation circuit when a load current increases and to increase the pulse modulation frequency of the pulse width modulation circuit when the load current decreases, and further operable to independently vary both the pulse width and frequency of the pulse width modulation voltage regulator.

19. The electronic circuit assembly of claim 18, wherein the control circuit comprises a processor.

20. The electronic circuit assembly of claim 18, wherein the control circuit is further operable to change a duty cycle of the pulse width modulation circuit in response to variations in a voltage regulator circuit output voltage.

21. A computer system, the computer system comprising a processor and a voltage regulation module, the voltage regulation module comprising:
   a pulse width modulation circuit; and
   a control circuit, the control circuit operable to reduce a pulse modulation frequency of the pulse width modulation circuit when a load current increases and to increase the pulse modulation frequency of the pulse width modulation circuit when the load current decreases, and further operable to independently vary both the pulse width and frequency of the pulse width modulation voltage regulator.

22. The computer of claim 21, wherein the control circuit comprises a processor.

23. The computer of claim 21, wherein the control circuit is further operable to change a duty cycle of the pulse width modulation circuit in response to variations in a voltage regulator circuit output voltage.

* * * * *

UNITED STATES PATENT AND TRADEMARK OFFICE
CERTIFICATE OF CORRECTION

PATENT NO. : 7,046,528 B2 Page 1 of 1
APPLICATION NO. : 10/335185
DATED : May 16, 2006
INVENTOR(S) : Sankman et al.

It is certified that error appears in the above-identified patent and that said Letters Patent is hereby corrected as shown below:

On the face page, in field (75), in "Inventors", in column 1, line 3, delete "Chandker," and insert - - Chandler, - -, therefor.

On the face page, in field (56), in "U.S. Patent Documents", in column 2, line 5, delete "363/17" and insert - - 363/19 - -, therefor.

On the face page, in field (56), under "Foreign Patent Documents", in column 2, line 1, after "4/2000" insert - - H02M/3/335 - -.

In column 1, line 35, delete "volt" and insert - - volts - -, therefor.

In column 2, line 31, delete "modulation" and insert - - modulated - -, therefor.

In column 4, line 17, delete "an" and insert - - and - -, therefor.

Signed and Sealed this

Twenty-second Day of August, 2006

JON W. DUDAS
*Director of the United States Patent and Trademark Office*